No Printed Specification Available
8509X
L. Burnell.
Cooking Stove.
Patented Nov. 25, 1834.
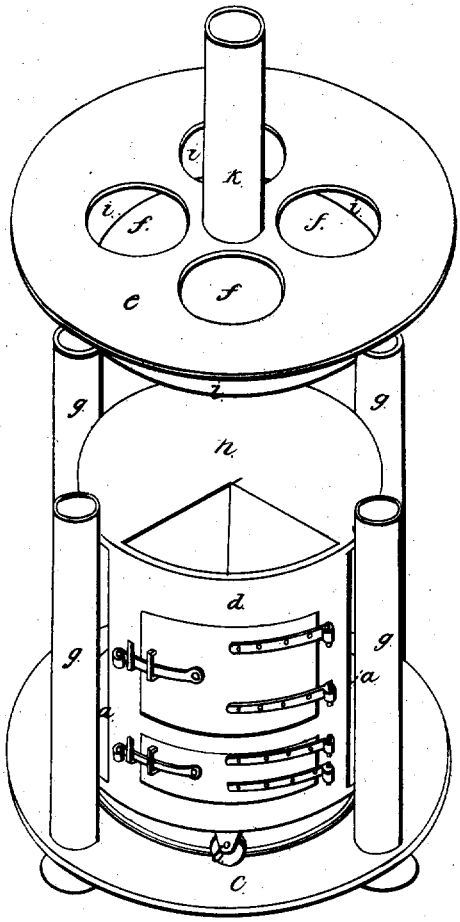

8509x

Vol. 19.

Nov. 25. 1834

Levi Burnell, of Elyria, Ohio.
Letters Patent

The schedule referred to, in these Letters Patent and making part of the same containing a description in the words of the said Levi Burnell himself, of his improvement in the construction of the Cooking Stove.

---

To all to whom these presents shall come: Be it known that I, Levi Burn of Elyria, in the County of Lorain, and State of Ohio, have invented a new and useful improvement in the construction of the Cooking Stove; and that th following is a description of the Stove, embracing the said improvement as in vented by me, or an explanation of the principle and operation of said im provement as invented by me. A cooking Stove embracing my improve ment may consist of the following parts or things viz. a hearth, a fire chest; a superior top plate with griddles and flue, a base, stand, or foot frame colums, pivots, friction wheels or castors; grate, doors & dampers.
The hearth which may be a metallic disk is sustained by a pivot, fricti wheels or castors, resting upon the base or foot frame, and so arranged as t allow a horizontal rotary movement to said hearth. The fire chest is s located upon the hearth, between its centre and circumference, that the rot motion of the hearth upon its axis determines an circular path for the entir fire chest, broad as itself, horizontally around a point corresponding verti cally with the axis of said hearth. The superior top plate has its openin for boilers, griddles, &c. arranged in a circular succession around a point ne its centre, so that their location is directly over the path of the fire chest, the by a rotary movement, of the hearth upon its axis, the fire chest may be brought immediately beneath either one of the griddles or openings in the s perior plate. Said superior top is intended to be stationary, and rests upon the necessary number of columns which rise from the foot frame or base requiring no description. The top plate of the fire chest is also a disk, co responding in breadth with the hearth, has the necessary opening for flame & smoke through the section, which would otherwise cover the fire chest & b a pivot at the centre of its upper surface, extending to a fixture connected 8509x Nov. 25, 1834 with the superior top, is restricted to the single movement of horizontal rotation - a rim or hoop circumscribing the space occupied by the openings in the superior top plate and extending downwards until it comes nearly in contact with the circumference of the inferior top plate, is necessary, in order that the smoke from the fire chest shall not escape into the room until it reaches the flue. The grate, doors & dampers, being of familiar construction and application need not be specified. I have contemplated a variety of forms and sizes of fire chest, adapted to the several kinds of fuel in use; and also in addition to the close and open grate for coal, on that side of the fire chest opposite the axis. I also intend not to confine myself to the perfectly circular, or perfectly plain or flat hearth, but to dispense with all unnecessary portions of it, and to sink or raise the same in such places as best accommodates the main design of convenience, economy and utility.

In the foregoing description of a complete Stove, most of the parts enumerated are either not new or not peculiar. That particular part of quality claimed to be new, and for which only letters patent are especially desired, is, the horizontal rotary movement of the fire chest, in such a manner as to be able to apply at pleasure the greatest heat of the fire directly to either one of the boilers, griddles or openings, in the superior top plate, while the said top remains stationary.

Witnesses
G. N. Fletcher
T. D. Ellis

Levi Burnell

Exd [illegible]

(Patented November 25. 1834.)